(12) United States Patent
Finlayson

(10) Patent No.: US 9,729,713 B2
(45) Date of Patent: Aug. 8, 2017

(54) METHOD AND SYSTEM FOR PROCESSING MEDIA DATA FOR LATER ACCESS

(71) Applicant: METASWITCH NETWORKS LTD, Middlesex (GB)

(72) Inventor: Piers Finlayson, Middlesex (GB)

(73) Assignee: METASWITCH NETWORKS LTD, Enfield (GB)

( * ) Notice: Subject to any disclaimer, the term of this patent is extended or adjusted under 35 U.S.C. 154(b) by 376 days.

(21) Appl. No.: 14/099,668

(22) Filed: Dec. 6, 2013

(65) Prior Publication Data

US 2014/0105378 A1    Apr. 17, 2014

Related U.S. Application Data

(63) Continuation of application No. PCT/GB2012/051280, filed on Jun. 7, 2012.

(30) Foreign Application Priority Data

Jun. 7, 2011    (GB) .................................. 1109521.3

(51) Int. Cl.
*H04M 3/50*    (2006.01)
*H04M 3/46*    (2006.01)
(Continued)

(52) U.S. Cl.
CPC .......... *H04M 3/46* (2013.01); *H04M 3/2281* (2013.01); *H04M 3/42221* (2013.01);
(Continued)

(58) Field of Classification Search
CPC .. H04M 3/46; H04M 3/54; H04M 2215/0164; H04M 15/04
(Continued)

(56) References Cited

U.S. PATENT DOCUMENTS 5,930,698 A    7/1999 Bertacchi
6,233,318 B1    5/2001 Picard et al.
(Continued)

FOREIGN PATENT DOCUMENTS

EP    0835015 A2    4/1998
EP    1111892 A2    6/2001
(Continued)

OTHER PUBLICATIONS

International Search Report for Parent PCT Application No. PCT/GB2012/051280, dated Sep. 6, 2012.
(Continued)

*Primary Examiner* — Ahmad F Matar
*Assistant Examiner* — Jirapon Intavong
(74) *Attorney, Agent, or Firm* — EIP US LLP

(57) ABSTRACT

A user has access to first and second telephony services. A call setup request directed to a first telephony party identifier associated with the first service is received from a caller and it is determined that the user is not available via the first service. A call setup request is transmitted to a telephony service destination associated with the second service to establish a telephony session between the caller and the destination. Media data transmitted during the session is caused to be captured using a media capture device intermediate the caller and the destination. The captured media data or media data derived therefrom is stored in a media data store so that the user can access the media data after the end of the session to determine what media data was transmitted during the session. The stored media data or media data derived therefrom is made accessible by the user.

23 Claims, 5 Drawing Sheets

(51) Int. Cl.
*H04M 3/22* (2006.01)
*H04M 3/54* (2006.01)
*H04M 3/42* (2006.01)

(52) U.S. Cl.
CPC ......... *H04M 3/42229* (2013.01); *H04M 3/54* (2013.01); *H04M 3/42059* (2013.01); *H04M 2201/40* (2013.01); *H04M 2207/203* (2013.01)

(58) Field of Classification Search
USPC .................................................. 379/211.03
See application file for complete search history.

(56) References Cited

U.S. PATENT DOCUMENTS

| | | |
|---|---|---|
| 6,661,886 B1 | 12/2003 | Huart et al. |
| 6,731,926 B1 | 5/2004 | Link et al. |
| 6,823,057 B1 | 11/2004 | Pershan et al. |
| 6,842,506 B1 | 1/2005 | Bedingfield |
| 7,245,713 B1 | 7/2007 | Simpson et al. |
| 8,488,768 B2 | 7/2013 | Finlayson et al. |
| 2002/0181688 A1 | 12/2002 | Huang et al. |
| 2004/0185836 A1 | 9/2004 | Pelaez et al. |
| 2004/0258220 A1 | 12/2004 | Levine et al. |
| 2005/0075106 A1 | 4/2005 | Jiang |
| 2007/0263794 A1* | 11/2007 | Mocenigo .................... 379/67.1 |
| 2009/0232128 A1 | 9/2009 | Paulis et al. |
| 2009/0325544 A1 | 12/2009 | Deutsch et al. |
| 2010/0080365 A1 | 4/2010 | Seetharaman et al. |
| 2010/0142684 A1 | 6/2010 | Chang et al. |
| 2010/0150322 A1 | 6/2010 | Yin et al. |

FOREIGN PATENT DOCUMENTS

| | | |
|---|---|---|
| EP | 1249993 A1 | 10/2002 |
| EP | 2043347 A1 | 4/2009 |
| GB | 2342809 A | 4/2000 |
| WO | 2005017693 A2 | 2/2005 |
| WO | 2006094554 A1 | 9/2006 |

OTHER PUBLICATIONS http://replay.waybackmachine.org/20090208233405/http://gotvoice.com/faq.php, Feb. 8, 2009.
http://replay.waybackmachine.org/20090225071509/http://gotvoice.com/unification.php, Feb. 25, 2009.

* cited by examiner

FIG. 1 – PRIOR ART

FIG. 2 – PRIOR ART

METHOD AND SYSTEM FOR PROCESSING MEDIA DATA FOR LATER ACCESS

CROSS-REFERENCE TO RELATED APPLICATIONS

This application is a continuation under 35 U.S.C. §120 of International Application No. PCT/GB2012/051280, filed Jun. 7, 2012 (and published in the English language on Dec. 13, 2012 as WO 2012/168712 A1), which claims priority to GB Application No. 1109521.3 filed Jun. 7, 2011. Each of the above-referenced applications is hereby incorporated by reference in its entirety.

BACKGROUND

Field

The present disclosure relates to a method and system for processing media data and to a computer program product for causing a computerized device to perform the method.

Description of the Related Technology

A multi-service user has services enabling them to make calls from, and receive calls at, multiple telephones. One of the telephones may, for example, be a landline telephone and the other telephone may be a mobile telephone, or vice versa. Alternatively, one of the telephones may be a landline telephone such as a home telephone and the other telephone may also be a landline telephone, but for an office or other fixed location remote from the multi-service user's office. Further alternatively, both telephones may be mobile telephones with telephony services operated by different service providers. As a further alternative, one or the other or both of the telephones may be telephones associated with Voice over Internet Protocol (VoIP) or Session Initiation Protocol (SIP) services. The telephony services for the telephones may be of different telephony service types (either provided by the same or different service providers) or may be of the same telephony service type operated by different telephony service providers.

FIG. 1 shows a prior art telecommunications system 1. The telecommunications system 1 includes a telephone 100 (denoted telephone A) which is connected to a Public Switched Telephone Network (PSTN) 102. The PSTN 102 is connected to a first service provider network 104.

The first service provider network 104 includes a local telephone exchange switch 108 which serves a telephone 110 (denoted telephone B).

The telecommunications system 1 also includes a second service provider network 112 to which a telephone 114 (telephone C) is connected. The second service provider network 112 interfaces with the PSTN 102 via one or more local telephone exchange switches and/or gateways 116, the operation of which is known to one skilled in the art and will not be described in detail herein.

FIG. 2 is a flow diagram according to the prior art which illustrates the steps involved in a user of telephone A (the calling party) calling a multi-service user, associated with telephones B and C, at telephone B in the first service provider network 104, the multi-service user not being available at telephone B, and the local telephone exchange switch 108 routing the call to telephone C in the second service provider network 112.

At step 2a, the user of telephone A dials a telephone number associated with telephone B to initiate a call to telephone B, which causes a call setup request to be sent into the PSTN 102 at step 2b. The call setup request contains a calling line identifier (CLI) (also referred to as a caller ID) for telephone A (denoted CLI: A) and a destination dialing number for telephone B (denoted DN: B). The call setup request traverses the PSTN 102 and is routed, at step 2c, to the local telephone exchange switch 108 in the first service provider network 104.

At step 2d, the local telephone exchange switch 108 attempts call setup to telephone B and determines that the multi-service user is unavailable at telephone B. In this case, the user of telephone B has subscribed to CLI services and the user of telephone A has not withheld their CLI when making the call, so the signaling message of step 2d contains a CLI for telephone A.

At steps 2e, 2f and 2g, the local telephone exchange switch 108 includes the originating CLI for the call (denoted CLI: A) and a destination dialing number for telephone C (denoted DN: C) in a call setup request and forwards the call setup request to telephone C, via the PSTN 102 and the one or more local telephone exchange switches and/or gateways 116 in the second service provider network 112.

There are various telephony services that facilitate such call re-routing to telephone C. For example, a call forwarding (also called call divert) service can be implemented at the local telephone exchange switch 108 in the first service provider network 104 to redirect calls to the multi-service user at telephone B to telephone C. In some cases, all calls directed to telephone B can be forwarded to telephone C. In other cases, calls directed to telephone B can be forwarded to telephone C if a call to telephone B is not answered or if telephone B is being used when a call attempt to it is made.

After various call setup procedures that will be known to those skilled in the art, such as causing telephone C to generate a ringing tone to alert the multi-service user to the fact that an incoming call to it is being made and generating a ringback tone at telephone A to inform the calling party that telephone C is ringing, the multi-service user answers the incoming call at telephone C at step 2h and a telephony session is established between the calling party at telephone A and the multi-service user at telephone C (item 2i). Media data, such as voice or video data, can then flow between telephone A and telephone C via the PSTN 102 and the one or more local telephone exchange switches and/or gateways 116 in the second service provider network 112 so that the calling party and the multi-service user can communicate with each other.

Although such telephony services enable the call to the multi-service user to be transferred to a more appropriate telephone, in this case telephone C, it may be desirable to provide additional telephony services to the multi-service user.

It would, therefore, be desirable to provide improved and/or additional telephony services for multi-service users who have access to a plurality of telephony services.

SUMMARY

According to one embodiment, there is provided a method for processing media data transmitted during a telephony session for a multi-service user in a telecommunications system, the multi-service user having access to a plurality of telephony services including a first telephony service and a second telephony service. The method may include receiving a call setup request from a calling party directed to a first telephony party identifier associated with the first telephony service and determining that the multi-service user is not available via the first telephony service. The method may further include transmitting a call setup request to a telephony service destination associated with the second telephony service to establish a telephony session between the calling party and the telephony service destination associated with the second telephony service and causing media data transmitted during the telephony session to be captured using a media capture device intermediate the calling party and the telephony service destination. The media data captured by the intermediate media capture device or media data derived therefrom may be stored in a media data store so that the user who was not available via the first telephony service can access the media data after the end of the telephony session to determine what media data was transmitted during the telephony session. The stored media data or media data derived therefrom is made accessible by the multi-service user.

According to another embodiment, a system for processing media data transmitted during a telephony session for a multi-service user in a telecommunications system, the multi-service user having access to a plurality of telephony services including a first telephony service and a second telephony service is provided. The system may include a receiver operable to receive a call setup request from a calling party directed to a first telephony party identifier associated with the first telephony service and a call processor operable to determine that the multi-service user is not available via the first telephony service. The system may further include a transmitter arranged to transmit a call setup request to a telephony service destination associated with the second telephony service to establish a telephony session between the calling party and the telephony service destination associated with the second telephony service and a processing engine arranged to cause media data transmitted during the telephony session to be captured using a media capture device intermediate the calling party and the telephony service destination. A media data store may be provided in which the media data captured by the intermediate media capture device or media data derived therefrom is stored so that the user who was not available via the first telephony service can access the media data after the end of the telephony session to determine what media data was transmitted during the telephony session. A transmitter operable to make the stored media data or media data derived therefrom accessible by the multi-service user is also provided.

In yet another embodiment, a computer program product is provided. The computer program product may comprise a non-transitory computer-readable storage medium having computer readable instructions stored thereon, the computer readable instructions being executable by a computerized device to cause the computerized device to perform a method for processing media data transmitted during a telephony session for a multi-service user in a telecommunications system, the multi-service user having access to a plurality of telephony services including a first telephony service and a second telephony service. The method may include receiving a call setup request from a calling party directed to a first telephony party identifier associated with the first telephony service and determining that the multi-service user is not available via the first telephony service. The method may further include transmitting a call setup request to a telephony service destination associated with the second telephony service to establish a telephony session between the calling party and the telephony service destination associated with the second telephony service and causing media data transmitted during the telephony session to be captured using a media capture device intermediate the calling party and the telephony service destination. The media data captured by the intermediate media capture device or media data derived therefrom in may be stored to a media data store so that the user who was not available via the first telephony service can access the media data after the end of the telephony session to determine what media data was transmitted during the telephony session. The stored media data or media data derived therefrom may be made accessible by the multi-service user.

Further features and advantages will become apparent from the following description of preferred embodiments, given by way of example only, which is made with reference to the accompanying drawings.

DETAILED DESCRIPTION OF CERTAIN INVENTIVE EMBODIMENTS

Figure 1:
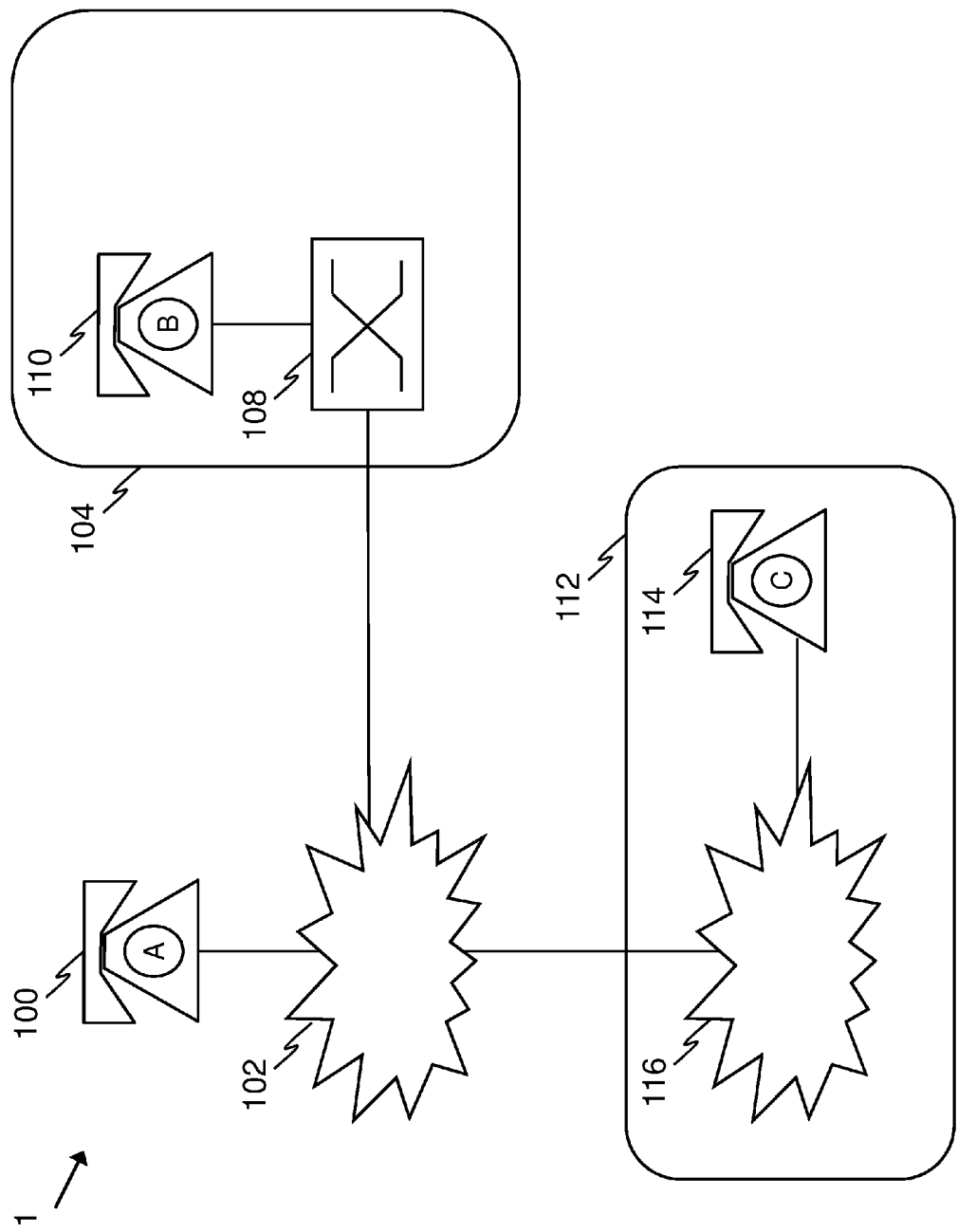
FIG. 1 is a schematic system diagram of a prior art telecommunications system.
Figure 2:
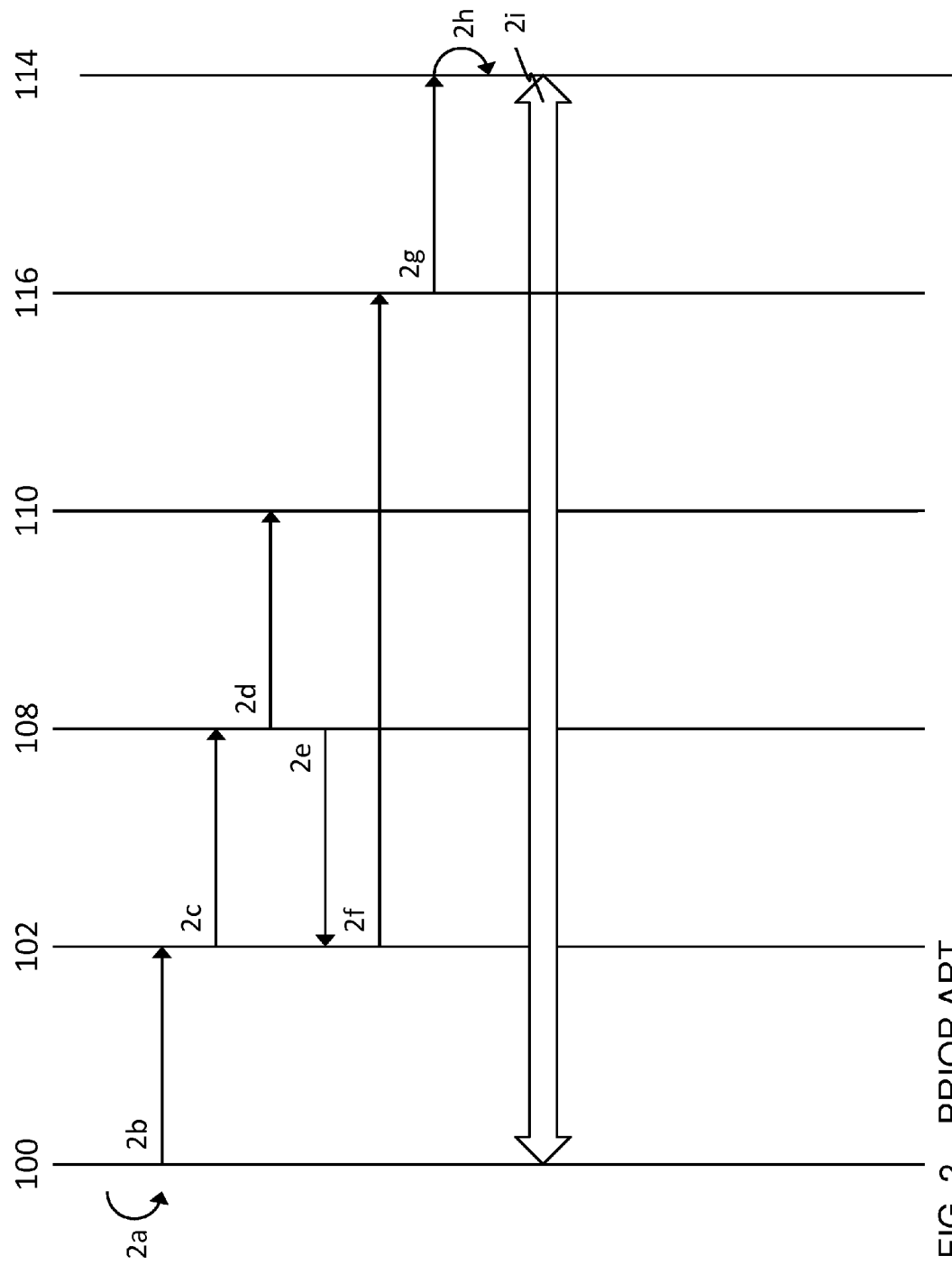
FIG. 2 is a flow diagram according to the prior art.
Figure 3:
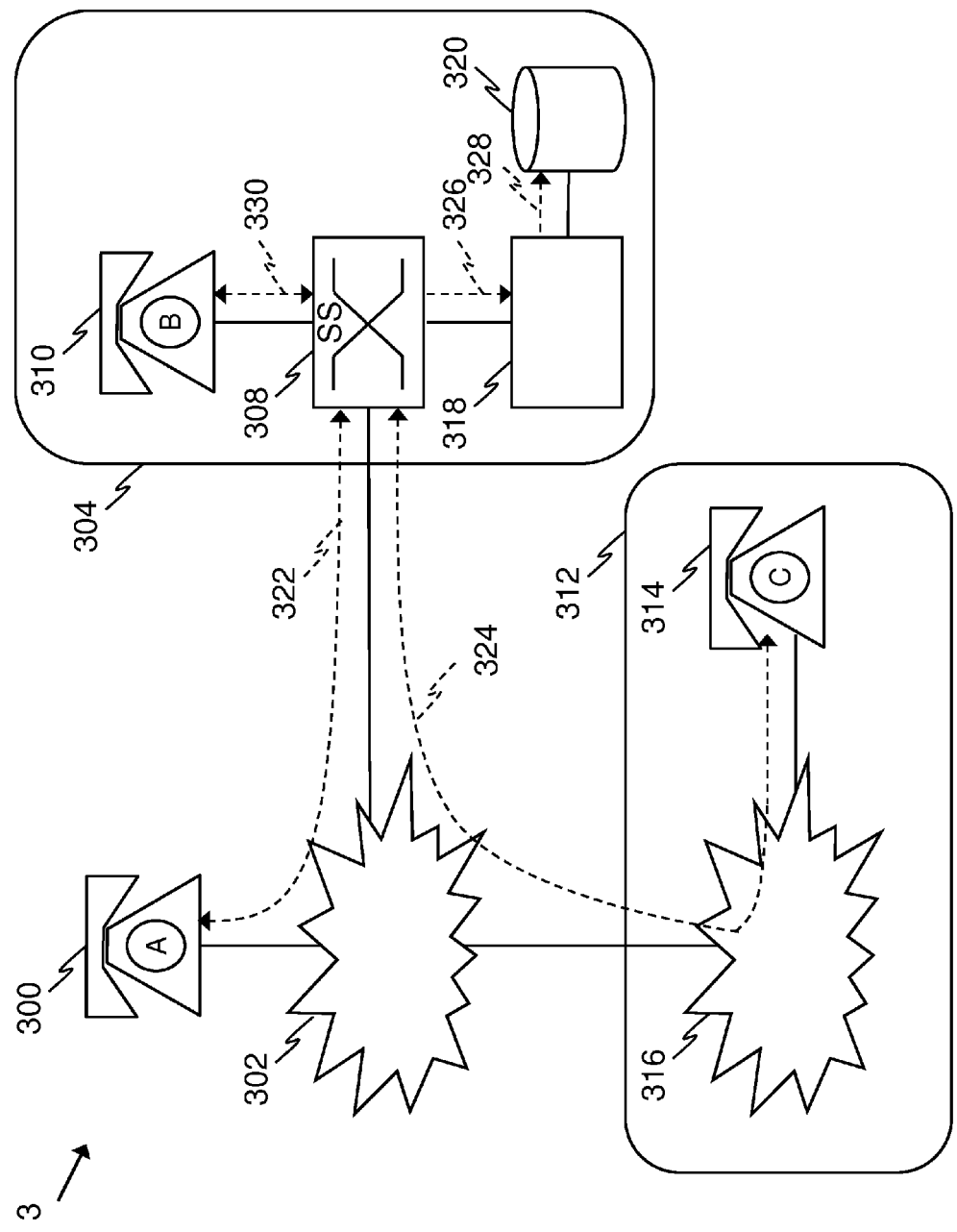
FIG. 3 is a schematic system diagram of a telecommunications system according to embodiments.

FIG. 3 shows a telecommunications system 3 according to embodiments. The telecommunications system 3 is similar to the telecommunications system 1 described above with reference to FIG. 1 in the sense that it includes some of the same or similar network elements to the telecommunications system 1 depicted in FIG. 1. Similar elements are shown in the telecommunications system 3 depicted in FIG. 3 with the same reference numerals as those used in FIG. 1, but incremented by 200.

The telecommunications system 3 includes a remote user's service provider network, such as a PSTN 302, to which a telephone 300 (denoted telephone A) is connected and which is connected to a multi-service user's first service provider network 304. The first service provider network 304 includes a telephony softswitch 308 which serves a telephone 310 (denoted telephone B).

The telecommunications system 3 also includes a multi-service user's second service provider network 312 to which a telephone 314 (denoted telephone C) is connected. The second service provider network 312 interfaces with the PSTN 302 via one or more local telephone exchange switches and/or gateways 316.

The telephony softswitch 308 in the first service provider network 304 provides a data processing function and is implemented as a network entity within the first service provider network 304. One or more media and/or signaling gateways (not shown) may interface between the PSTN 302, the first service provider network 304 and the second service provider network 312 and may be controlled by the telephony softswitch 308, or their function may be combined into the telephony softswitch 308 itself.

As well as conventionally providing the architecture for enabling conversion between both media data and signaling protocols via one or more media gateways and signaling gateways, the softswitch 308 may conventionally provide call processing intelligence for use in the selection of processes that can be applied to a call, routing for a call within a network based on signaling and subscriber database information, the ability to transfer control of a call to another network element and management functions such as provisioning; and fault detection and billing. For ease of explanation, it is hereafter assumed that the softswitch 308 is one network entity, although in practice it may comprise a distributed set of such entities.

In addition to having elements in common with the telecommunications systems 1, in the telecommunications system 3 shown in FIG. 3, the first service provider network 304 further includes a media capture device 318 and a media data store 320 to which the media capture device 318 can write media data. In some embodiments, the media capture device 318 and the media data store 320 are included in the first service provider network 304, although it will be appreciated that in other embodiments, one or more of the media capture device 318 and the media data store 320 may not be included in the first service provider network 304. For example, the media capture device 318 can provided at a different location in the telecommunications system 3 intermediate telephone A and telephone C.

In some embodiments, the media data store 320 is associated with a mailbox service for the user that is provided by the first service provider.

In the embodiments shown in FIG. 3, the media capture device 318 captures media data passing through the softswitch 308, although the media capture device 318 could capture media data transmitted during a call in a different manner. Accordingly, references to media data being routed via the media capture device 318 or to the media capture device 318 remaining in the media path should be understood to include routing media data directly to the media capture device 318 so that it can actively capture the media data or routing the media data to another network element (such as the softswitch 308) so that the media capture device 318 can passively capture the media data.

The media path shown schematically in FIG. 3 includes various media path segments; segment 322 between telephone A and the softswitch 308, segment 324 between the softswitch 308 and telephone C, segment 326 between the softswitch 308 and the media capture device 318 and segment 328 between the media capture device 318 and the media data store 320. It will be appreciated that media data transmitted during the call passes along segments 322 and 324 and that segments 326 and 328 represent media data capture. A further media path segment 330 is depicted in FIG. 3 between the softswitch 308 and telephone B, which will be described in more detail below with reference to FIG. 5.

The media capture device 318 captures media data (such as audio and/or video data) transmitted during a call and stores the captured media data or media data derived from the captured media data (both are referred to hereinafter collectively as "captured or derived media data") in the media data store 320.

In some embodiments, the softswitch 308 alters signaling information in a call setup request originating from telephone A that it receives to re-route the call setup request to telephone C, for example by specifying the telephone number associated with telephone C as the destination dialing number in the altered call setup request. In such embodiments, the softswitch 308 can include routing information in the signaling information in the call setup request to specify that media data transmitted between telephone A and telephone C be routed via the media capture device 318. In a SIP environment, the softswitch 308 can include and/or modify session description information for the telephone call setup request (an INVITE request in SIP) to force media data to be routed via the media capture device 318.

In some embodiments, the softswitch 308 may generate a new call setup request to telephone C following determination that the multi-service user is not available at telephone B to bridge the telephone call between telephone A and telephone C and thereby remain in the media path for data transmitted during the telephone call. For example, in a SIP environment, the softswitch 308 can act as a Back-to-back User Agent (B2BUA) to serve as both a User Agent Server (UAS) and a User Agent Client (UAC). Media data transmitted during the call between telephone A and telephone C is routed via the softswitch 308 as a B2BUA and the media data can thereby be captured by the media capture device 318.

There are various means by which the media capture device 318 can capture the media data transmitted during a call.

For example in a VoIP system, the media capture device 318 may comprise a so-called 'packet-sniffer' or suchlike that detects signaling data (for example SIP signaling information) and media data (for example Real-time Transport Protocol (RTP) packets) in media packets that are routed in the telecommunications system 3 via the softswitch 308 and that have header information that indicate that the data should be recorded.

In some embodiments, the media capture device 318 comprises or can otherwise access a media data processing engine (not shown), which can be used to process the captured media data before or after it is stored in the media data store 320. Such processing may include, but is not limited to being, encoding captured media data into an appropriate media data format (such as Waveform Audio File Format (WAV) or Moving Picture Experts Group Audio Layer III (MP3) format for audio media data) for storage and/or transmission to the user. Such processing could also include transcribing voice data captured during the telephone call into text data, for example using a speech-to-text recognition engine.

Figure 4:
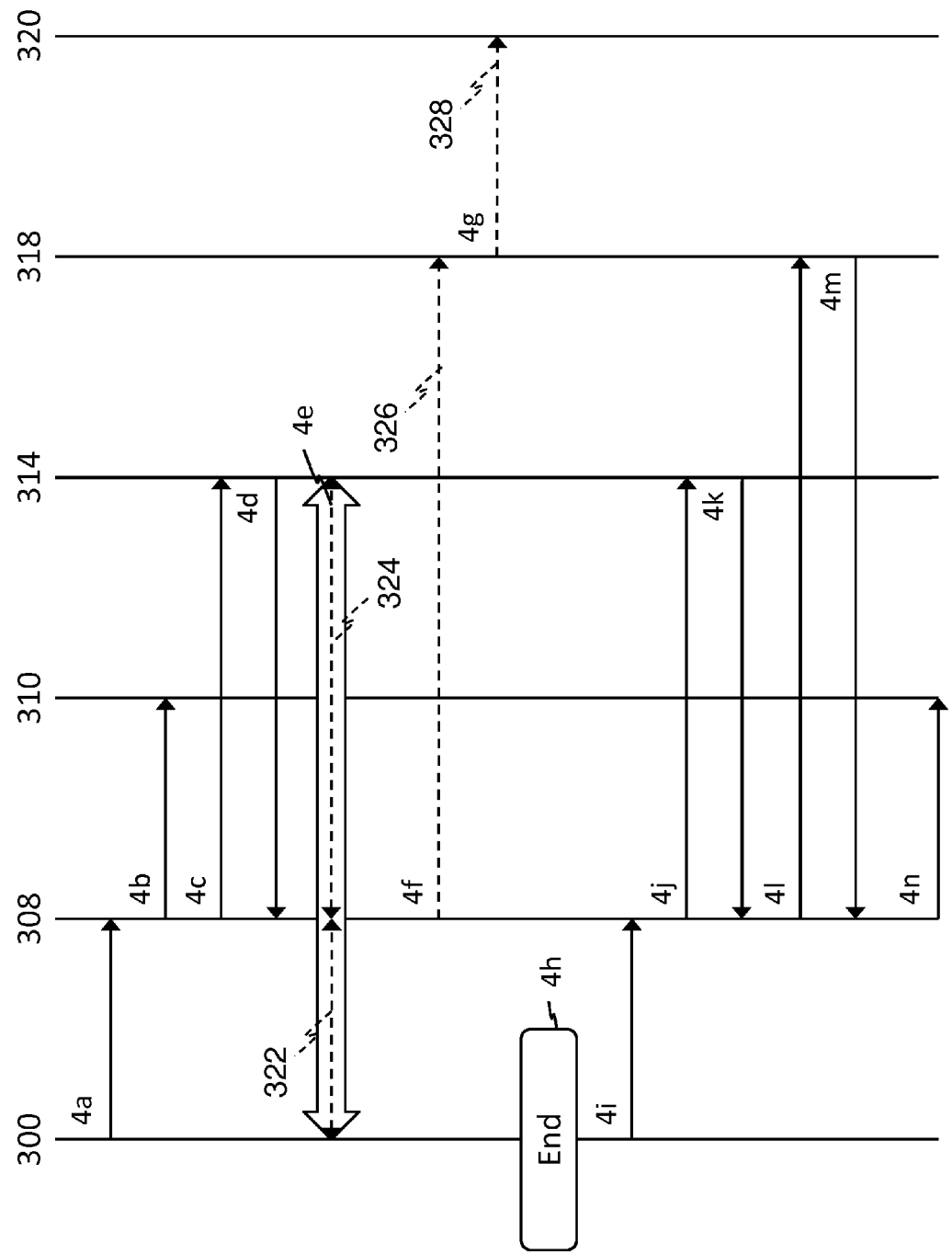
FIG. 4 is a sequence diagram showing a method according to embodiments.

FIG. 4 is a sequence diagram showing a method for capturing media data transmitted during a telephony session according to some embodiments.

Processing begins at step 4*a* when a user of telephone A enters a telephone number associated with telephone B, which initiates setup of a telephone call to telephone B via the PSTN 302.

The softswitch 308 which serves telephone B receives a call setup request from telephone A associated with the calling party that is directed to telephone B associated with the multi-service user and determines that the multi-service user is unavailable at telephone B, for example by ringing, or attempting to ring, telephone B at step 4*b*.

As explained above, in some embodiments, the softswitch 308 alters the destination address for the unanswered call to be that of telephone C and then forwards the call setup request containing the altered signaling information into the telecommunications system 3, which results in the signaling message being routed to telephone C at step 4*c*.

As also explained above, in some embodiments, at step 4*c*, the softswitch 308 generates a new call setup message for transmission to telephone C, to establish a new call leg to telephone C. The new call setup message includes an appropriate destination number for telephone C. The softswitch 308 can thereby bridge the call between telephone A and telephone C and remain in the media path during the call, once it has been connected.

The multi-service user accepts the call connection request at telephone C (for example after hearing a ringing tone generated at telephone C) and causes an answer message to be sent back to the softswitch 308 at step 4*d*. A telephony session is then established between telephone A and telephone C (see item 4*e*) and the softswitch 308 remains in the media path during the telephony session as indicated schematically in FIGS. 3 and 4 by media path segments 322 and 324 between telephone A and the softswitch 308, and the softswitch 308 and telephone C respectively. The telephony session can include an audio and/or video call.

At steps 4*f* and 4*g*, the media capture device 318 captures the media data routed via the softswitch 308 and writes it to the media data store 320, as indicated schematically in FIGS. 3 and 4 by media path segments 326 and 328. Media data transmitted during the telephony session is thereby transmitted to the media capture device 318 which is intermediate telephone A and telephone C.

The captured or derived media data is accessible by the multi-service user at the media data store 320.

In some embodiments, the first service provider network 304 may be configured to inform the user of telephone A (the calling party) that the media data is about to be captured prior to capturing or storing the media data, for example if legislation or best practice dictates that the user of telephone A should or must be so informed.

In some such embodiments, the user of telephone A may be required to confirm that they agree to the media data being captured before the capturing occurs. The confirmation may be by explicit user input, for example by the user of telephone A pressing a predetermined key on the telephone A so as to generate a corresponding predetermined Dual-tone Multi-frequency (DTMF) signal, by selecting a confirmation option on an Interactive Voice Response (IVR) menu or the like.

The media capture device 318 may be configured to capture some or all of the media data transmitted during the telephony session between telephone A and telephone C. For example, the media capture device may be configured only to capture media data originating from the calling party or from the called party. The media capture device 318 may be configured only to capture media information after the occurrence of a predetermined in-call event. Such an in-call event may be the generation of a predetermined DTMF tone.

In some embodiments, at item 4*h*, the user of telephone A ends the call to the multi-service user at telephone C, for example by placing the telephone A on hook or by pressing an "END" hard or soft button on telephone A. This causes a switch or other entity (not depicted) in the PSTN 302 to generate an appropriate release or cancel message which it transmits to the softswitch 308 at step 4*i*.

At step 4*j*, the softswitch 308 transmits an appropriate message to telephone C to end the telephony session and receives a response message from telephone C at step 4*k*. At step 4*l*, the softswitch 308 transmits an appropriate message to the media capture device 318 to inform the media capture device 318 that the call between telephone A and telephone C has terminated. The media capture device 318 returns an appropriate acknowledgement message at step 4*m*.

In some embodiments, the acknowledgement message of step 4*m* includes address information identifying the location of the media data store 320 at which the captured or derived media data has been stored so that the multi-service user can access it.

In some embodiments, the softswitch 308 transmits a message to the multi-service telephone B at step and/or to telephone C at step 4*n* to inform the multi-service user that the captured or derived media data is accessible at the media data store 320. Thus, the softswitch 308 transmits the message of step 4*n* after the end or termination of the telephone call between telephone A and telephone C.

In some embodiments, the message of step 4*n* comprises a Message Waiting Indicator (MWI) message which causes a Light-emitting Diode (LED) on telephone B to illuminate or may cause a suitable message or graphical item to be displayed on a display device (such as a Liquid Crystal Display (LCD)) associated with telephone B to inform the multi-service user that the media data has been captured. Another type of alert, such as generating a stuttered dialing tone when telephone B is taken off hook, may be used to inform the multi-service user that the media data has been captured. It will be appreciated that the message of step 4*n* could, instead or additionally, be sent to another device or communications identifier associated with the multi-service user in the telecommunications system 3, such as a telephone number associated with telephone C, an e-mail address associated with the multi-service user or the like.

The message of step 4*n* may be an e-mail message (addressed to an e-mail address associated with the multi-service user), a Short Messaging Service (SMS) message, a Multimedia Messaging Service (MMS) message, a message to a messaging service (such as Skype™) to which the user is a subscriber or a message (such as a push notification) to a software application.

In some embodiments, the message of step 4*n* identifies an access location at which the user can access the captured or derived media data. In some embodiments, the message of step 4*n* may comprise the captured or derived media data as an attachment.

Figure 5:
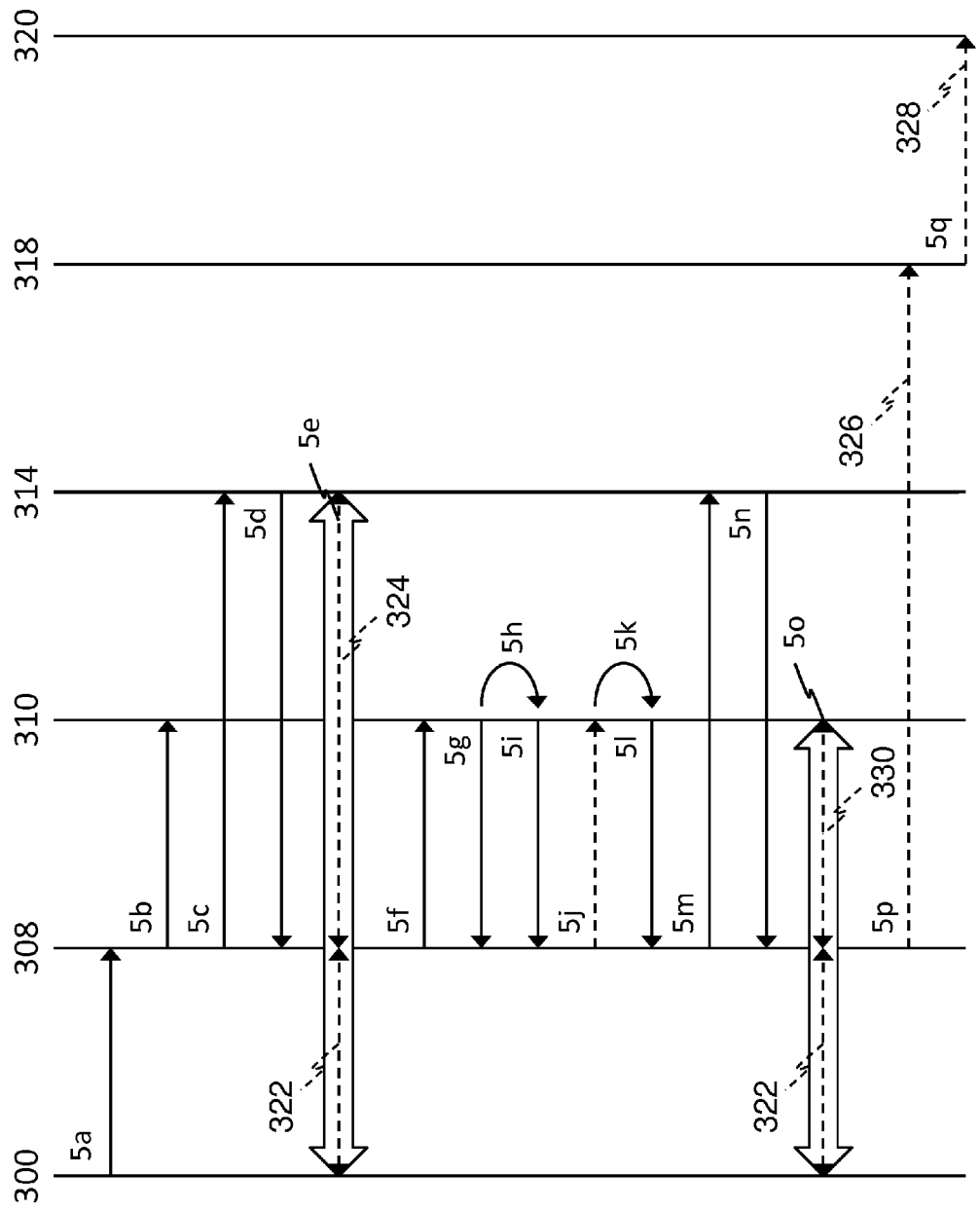
FIG. 5 is a sequence diagram showing a method according to embodiments.

FIG. 5 is a sequence diagram showing a method for providing an alert to a multi-service user according to some embodiments.

Steps 5*a* to 5*d* and item 5*e* correspond to steps 4*a* to 4*d* and item 4*e* respectively that have been described above in relation to FIG. 4. In particular, at item 5*e* (c.f. item 4*e* of FIG. 4), a telephony session is established between telephone A and telephone C. The telephony session is depicted as including two media path segments; segment 322 between telephone A and the softswitch 308 and segment 324 between the softswitch 308 and telephone C.

At step 5*f*, instead of capturing media data transmitted during the telephony session, the softswitch 308 transmits an alert message to the multi-service user at telephone B to inform the multi-service user that it re-routed the call to telephone C. In some embodiments, the softswitch 308 may transmit the alert to another device or communications identifier associated with the multi-service user instead of, or in addition to, transmitting the alert to telephone B. Telephone B responds with an acknowledgement message to the softswitch 308 at step 5*g*.

In some situations, the user may not have been available at telephone B because the user was in-call already using telephone B. In such situations, the alert message can cause the telephone B to generate an alert, such as a visual alert or an in-call alert such as a 'beep', while telephone B is being used.

If the telephone B has a ringtone for incoming calls, the alert message can cause telephone B to generate an audible alert that is different from the ringtone so that the user can distinguish the alert for the incoming call from that for which the softswitch 308 has redirected the incoming call to telephone C.

At step 5*h*, the multi-service user is presented with the opportunity to listen to the ensuing telephone call between telephone A and telephone C and, via an appropriate input by the multi-service user at telephone B, the user indicates that they wish to listen to the telephone call. An appropriate confirmation message is provided from telephone B to the softswitch 308 at step 5*i*.

At step 5*j*, the softswitch 308 relays the media data transmitted during the call to telephone B. It will be appreciated that the media capture device 318 may, instead, relay the media data to telephone B, via the softswitch 308, if the media capture device 308 is actively included in the media path.

At step 5*k*, the multi-service user is presented with the opportunity to interrupt the ensuing telephone call between telephone A and telephone C that they have been listening to and, via an appropriate input by the multi-service user at telephone B, the user indicates that they do wish to interrupt the telephone call. An appropriate confirmation message is provided from telephone B to the softswitch 308 at step 5*l*.

As explained above, in some embodiments, the softswitch 308 can control call processing of the telephony session established between telephone A and telephone C that the multi-service user wishes to interrupt. In such embodiments, the softswitch 308 can join telephone B into the telephony session.

Since both telephone B and telephone C are associated with the multi-service user, in some embodiments (for example if the softswitch 308 serves as a B2BUA), the softswitch 308 sends an appropriate message (such as a SIP BYE message) to telephone C to terminate the leg of the call between the softswitch 308 and telephone C at step 5*m*. Telephone C responds with an appropriate message (such as a SIP 200 OK message) to the softswitch 308 at step 5*n*.

At item 5*n*, the telephony session ensues between telephone A and telephone B via the softswitch 308 and the PSTN 302, as indicated in FIG. 5 by media path segments 322 (between telephone A and the softswitch 308) and 330 (between the softswitch 308 and telephone B).

Similarly to steps 4*f* and 4*f* described above with reference to FIG. 4, at steps 5*p* and 5*q*, media data transmitted during the telephony session between telephone A and telephone B may be captured by the media capture device 318 and written to the media data store 320.

Various measures (for example a method, system and computer program product) for processing media data transmitted during a telephony session for a multi-service user in a telecommunications system are provided. The multi-service user has access to a plurality of telephony services including a first telephony service and a second telephony service. A call setup request is received from a calling party directed to a first telephony party identifier associated with the first telephony service. A determination is made that the multi-service user is not available via the first telephony service. A call setup request is transmitted to a telephony service destination associated with the second telephony service to establish a telephony session between the calling party and the telephony service destination associated with the second telephony service. Media data transmitted during the telephony session is caused to be captured using a media capture device intermediate the calling party and the telephony service destination. The media data captured by the intermediate media capture device or media data derived therefrom is stored in a media data store so that the user who was not available via the first telephony service can access the media data after the end of the telephony session to determine what media data was transmitted during the telephony session. The stored media data or media data derived therefrom is made accessible by the multi-service user.

Media data, such as video and/or audio data, transmitted during the telephony session can thus be captured at the intermediate media capture device and stored in a media data store where it is accessible to the user. The user, who was unavailable via the first telephony service, can then access the media data to determine what media data was transmitted during the telephony session, for example to get a better understanding of the purpose of the calling party's call. The user may be able to access the captured media data or media data derived therefrom at a later, more convenient time, after termination of the telephony session. In some cases, a second telephony service provider that provides the second telephony service might not facilitate such media capturing during the telephony session. In such cases, a first telephony service provider that provides the first telephony service can provide additional services to the multi-service user that are not provided by the second telephony service provider, for example by facilitating or providing the media capture. Even if the second telephony service provider does provide such services, the first telephony service provider can supplement or enhance them.

In some embodiments, the media data transmitted during the telephony session is captured using the media capture device.

In some embodiments, signaling information is included in the call setup request so that the media data transmitted during the telephony session is routed via the media capture device.

In some embodiments, a message is transmitted to inform the user that the captured media data or media data derived therefrom is accessible at the data store.

In some embodiments, the stored media data or the media data derived therefrom is transmitted to a service destination associated with the first telephony party identifier.

In some embodiments, the stored media data or the media data derived therefrom is transmitted to a service destination associated with a second telephony party identifier associated with the second telephony service.

In some embodiments, an alert message is transmitted to the user to inform the user of said capturing of the media data. In some such embodiments, a determination is made that the user is using a telephony device associated with the first telephony party identifier. The alert message is operable to cause the telephony device to generate an alert while the telephony device is being used.

In some embodiments, the media data comprises voice data and the method comprises transcribing the voice data to provide text data derived from the voice data.

In some embodiments, said transcribing comprises performing speech-to-text transcription using a speech recognition engine.

In some embodiments, media data captured during the telephony session or media data derived therefrom is relayed to the user.

In some embodiments, a call interruption request is received from the user and, in response, the user is joined as a party into the telephony session.

In some embodiments, the media data store is associated with the first telephony service.

In some embodiments, the telephony service destination associated with the second telephony service is a mailbox service for the user.

In some embodiments, signaling information is included in the call setup request. The signaling information comprises a telephony party identifier associated with the user.

In some such embodiments, the included telephony party identifier associated with the user is associated with the second telephony service.

In some embodiments, the first telephony service is provided by a first telephony service provider and the second telephony service is provided by a second, different telephony service provider.

In some embodiments, the first and second telephony services are provided by the same telephony service provider.

In some embodiments, a media data processing engine is used to process the captured media data before it is stored in the media data store.

In some embodiments, a media data processing engine is used to process the captured media data after it is stored in the media data store.

In some embodiments, the system for processing media data transmitted during a telephony session for a multi-service user in a telecommunications system comprises the media capture device.

The above embodiments are to be understood as illustrative examples. Further embodiments are envisaged.

For example, in the above embodiments, the multi-service user is associated with telephone B and telephone C. However, the user could be associated with different types of telephony service destinations.

For example, if the softswitch 308 determined that the user was not available at telephone B, instead of re-routing the call to telephone C, the call could be re-routed to a voicemail service for the multi-service user provided by the second service provider. In such cases, the calling party could leave a voicemail message at the voicemail service provided by the second service provider and, in some embodiments, the voicemail message could also be captured by the media capture device 318 in the first telephony service network 304.

The softswitch 308 can include signaling information in the call setup request it transmits to the voicemail service to include a telephony party identifier associated with the user, such as a telephony party identifier for the user that is associated with the second telephony service. Including a telephony party identifier for the user that is associated with the second telephony server enables the voicemail service to identify the correct voicemail box for the user.

It will be appreciated that the first and second telephony services may comprise any one or more of the following: a wireline telephony service, a wireless telephony service, and a Voice over Internet Protocol (VoIP) telephony service. Other types of telephony service are also envisaged.

The telephony softswitch 308 described above may be or comprise a media gateway controller, service platform, call agent or softswitch and may perform other functions typically associated with such entities.

In some embodiments described above, the calling party may be required to confirm that they consent to media data transmitted during a telephony session being captured. In other embodiments, the calling party may be informed that media data will be captured during the telephony session. It can then be inferred that the calling party consents to the capturing if the calling party continues with the telephony session. For example, if the user of telephone A is informed that the media data will be captured and continues with the call, the user of telephone A can be considered to have implicitly consented to the capturing.

Various measures (for example a method and apparatus) for processing media data transmitted during a telephony session for a multi-service user in a telecommunications system are provided. The multi-service user has access to a plurality of telephony services including a first telephony service and a second telephony service. A call setup request is received from a calling party directed to a first telephony party identifier associated with the first telephony service. A determination is made that the multi-service user is not available via the first telephony service. A call setup request is transmitted to a telephony service destination associated with the second telephony service to establish a telephony session between the calling party and the telephony service destination associated with the second telephony service. Media data transmitted during the telephony session is caused to be captured using a media capture device intermediate the calling party and the telephony service destination. The media data captured by the intermediate media capture device or media data derived therefrom is stored in a media data store so that the user who was not available via the first telephony service can access the media data after the end of the telephony session to determine what media data was transmitted during the telephony session. The captured media data or media data derived therefrom is thereby accessible by the multi-service.

Various measures (for example a method and system) for processing media data transmitted during a telephony session for a multi-service user in a telecommunications system are provided. The multi-service user has access to a plurality of telephony services including a first telephony service and a second telephony service. A call setup request is received from a calling party directed to a first telephony party identifier associated with the first telephony service. A determination is made that the multi-service user is not available via the first telephony service. A call setup request is transmitted to a telephony service destination associated with the second telephony service to establish a telephony session between the calling party and the telephony service destination associated with the second telephony service. Media data transmitted during the telephony session is caused to be captured using a media capture device intermediate the calling party and the telephony service destination. The captured media data is transmitted to a service destination to make the captured media data or media data derived therefrom accessible by the multi-service user.

Media data, such as video and/or audio data transmitted during the telephony session can be captured at the intermediate media capture device and transmitted to a service destination where it is accessible to the user. The user, who was unavailable via the first telephony service, can then access the media data to determine what media data was, or is being, transmitted during the telephony session, for example to get a better understanding of the purpose of the calling party's call. In some cases, a second telephony service provider that provides the second telephony service might not facilitate such media capturing during the telephony session. In such cases, a first telephony service provider that provides the first telephony service can provide additional services to the multi-service user that are not provided by the second telephony service provider, for example by facilitating or providing the media capture. Even if the second telephony service provider does provide such services, the first telephony service provider can supplement or enhance them. The telephony session can include audio and/or video data.

In some embodiments, call setup to a telephony service destination associated with the first telephony service is attempted. In such embodiments, an attempt can be made to reach the multi-service user at the telephony service destination associated with the first telephony service to determine in order to determine that the multi-service user is unavailable at the telephony service destination associated with the first telephony service. In other cases, calls to the telephony service destination associated with the first telephony service may be automatically re-routed to the telephony service destination associated with the second telephony service without attempting call setup to the telephony service destination associated with the first telephony service.

In some embodiments, the captured media data or media data derived therefrom is recorded. Such embodiments comprise the process of recording the media data or media data derived therefrom, for example so that the recording process can be controlled, optimized and the like. Media data may be derived from the captured media data so that, for example, it is in a format for improved access by the user.

In some embodiments, signaling information is included in the call setup request so that the media data transmitted during the telephony session is routed via the media capture device. In such embodiments, the media capture device can be included in the media path for the media data transmitted during the telephony session.

In some embodiments, the media data comprises voice data and such embodiments comprise transcribing the voice data to provide text data derived from the voice data. In such embodiments, the multi-service user can access transcribed speech data derived from data captured during the telephony session, for example so that a written record of a conversation conducting via the telephony session can be made.

In some embodiments, said transcribing comprises performing speech-to-text transcription using a speech recognition engine. In such embodiments, a speech recognition engine can be used to automate the transcription process and, possibly, to avoid the need for a human involvement.

In some embodiments, the capturing is in response to detecting the occurrence of a predetermined in-call event during the telephony session. In such embodiments, capturing may be delayed until the predetermined event occurs so as to capture particular media data. For example, the predetermined event may be detecting a predetermined Dual-tone multi-frequency signaling (DTMF) tone or, if the telephony session is established with a voicemail service, detecting that the calling party has started leaving a voicemail message (for example by detecting that the calling party has started speaking).

In some embodiments, an alert message is transmitted to the user to inform the user of said capturing of media data. In such embodiments, the user can be informed that the telephony session has been established and can take an appropriate action.

Various measures (for example a method and system) for providing an alert to a multi-service user in a telecommunications system are described. The multi-service user has access to a plurality of telephony services including a first telephony service and a second telephony service. A call setup request is received from a calling party directed to a first telephony party identifier associated with the first telephony service. A determination is made that the multi-service user is not available via the first telephony service. A call setup request is transmitted to a telephony service destination associated with the second telephony service to establish a telephony session between the calling party and the telephony service destination associated with the second telephony service. An alert message is transmitted to the user at a service destination in the telecommunications system other than the telephony service destination associated with the second telephony service to inform the user of said establishment of the telephony session.

Hence, the user can be informed that the telephony session has been established. One or more additional telephony services may be available or may be made available to the user as a result of the alerting.

In some embodiments, media data transmitted during the telephony session is transmitted via a media capture device intermediate the calling party and the telephony service destination, and such embodiments comprise causing media data transmitted during the telephony session to be captured using the intermediate device, and transmitting the captured media data to a service destination to make the captured media data or media data derived therefrom accessible by the multi-service user.

As explained above, media data, such as video and/or audio data transmitted during the telephony session can be captured at the intermediate media capture device and transmitted to a service destination where it is accessible to the user. The user, who was unavailable via the first telephony service, can then access the media data to determine what media data was, or is being, transmitted during the telephony session, for example to get a better understanding of the purpose of the calling party's telephone call.

Some embodiments comprise determining that the user is using a telephony device associated with the first telephony party identifier, and the alert message is operable to cause the telephony device to generate an alert while the telephony device is being used. In such embodiments, an attempt can be made to alert the user to the establishment of the telephony session even if the user is using a telephony device associated with the first telephony party identifier. Such an alert may be, for example audible, visual and/or haptic.

In some embodiments, the user is associated with a telephony device having a ringtone for incoming calls and the alert message is operable to cause the telephony device to generate an audible alert that is different from the ringtone. In such embodiments, the user may be able to distinguish that the alert pertains to the establishment of the telephony session (in circumstances in which the user was not available via the first service provider) so that the user can decide upon what, if any, action to take in response to the alert.

In some embodiments, media data captured during the telephony session or media data derived therefrom is relayed to the user. In such embodiments, the user can determine the content of the telephony session by having the media data transmitted during the telephony session relayed to them. For example, the user may be able to listen to a spoken conversation and/or watch a video conversation conducted via the telephony session. This can assist the user in deciding what, if any, action to take in response to the alert.

In some embodiments, a call interruption request is received from the user and, in response, joining the user as a party into the telephony session. In such embodiments, the user can be provided with an additional service of being able to participate in the telephony session.

In some embodiments, the service destination is associated with the first telephony party identifier. In such embodiments, the service destination (to which the captured media data or media data derived therefrom and/or the alert is transmitted) is that to which the call setup request was addressed by the calling party. This may be, for example, the most convenient service destination for the user and/or the telephony service provider(s).

In some embodiments, the service destination is associated with a second telephony party identifier associated with the second telephony service. In such embodiments, the service destination (to which the captured media data or media data derived therefrom and/or the alert is transmitted) is that to which the telephony session was established. This may be, for example, the most convenient service destination for the user and/or the telephony service provider(s).

In some embodiments, the service destination is a media data store. In such embodiments, service destination (to which the captured media data or media data derived therefrom and/or the alert is transmitted) can be a dedicated (or otherwise) media data store at which the user can access the captured media data or the media data derived therefrom. This may be, for example, the most convenient service destination for the user and/or the telephony service provider(s).

In some embodiments, the media data store is associated with the first telephony service. In such embodiments, the first telephony service provider that provides the first telephony service may be able to provide additional services by being associated with the media data store.

In some embodiments, the telephony service destination associated with the second telephony service is a mailbox service for the user. In such embodiments, when it is determined that the user is unavailable via the first telephony service, the call can be directed to a mailbox service so that the calling party can leave a voicemail message for the user.

In some embodiments, signaling information is included in the call setup request, the signaling information comprising a telephony party identifier associated with the user. In such embodiments, the user can be identified in the second telephony service (for example so that any voicemail message left by the calling party for the user can be stored in the correct voicemail box for the user).

In some embodiments, the included telephony party identifier associated with the user is associated with the second telephony service. In such embodiments, the user can be identified to the second telephony service using a telephony party identifier associated with the second telephony service, so that the second telephony service does not need to map or translate a foreign telephony party identifier into a telephony party identifier for the second telephony service.

In some embodiments, the first telephony service is provided by a first telephony service provider and the second telephony service is provided by a second, different telephony service provider. In such embodiments, the first telephony service provider may be able to provide the user with telephony services that are not available by the second, different telephony service provider (or to which the user has not subscriber if such services are available), for example if the first and second telephony service providers are not economically or otherwise connected.

In some embodiments, the first and second telephony services is provided by the same telephony service provider. In such embodiments, the same telephony service provider may be able to supplement services available via the second telephony service in the first telephony service.

In some embodiments, a computer program adapted to perform a method as described above is provided. The computer program can be implemented as a suite of software components adapted to run on a network node or be distributed over a system of network nodes.

In some embodiments, a computer program product comprising a non-transitory computer-readable storage medium having computer readable instructions stored thereon is provided. The computer readable instructions are executable by a computerized device to cause the computerized device to perform a method as described above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for processing media data transmitted during a telephony session for a multi-service user in a telecommunications system, the multi-service user having access to a plurality of telephony services including a first telephony service and a second telephony service, the method comprising:
   receiving a call setup request from a calling party directed to a first telephony party identifier associated with the first telephony service;
   determining that the multi-service user is not available via the first telephony service;
   transmitting a call setup request to a telephony service destination associated with the second telephony service to establish a telephony session between the calling party and the telephony service destination associated with the second telephony service;
   causing media data transmitted during the telephony session to be captured using a media capture device intermediate the calling party and the telephony service destination;
   storing the media data captured by the intermediate media capture device or media data derived therefrom in a media data store so that the user who was not available via the first telephony service can access the media data after the end of the telephony session to determine what media data was transmitted during the telephony session; and
   making the stored media data or media data derived therefrom accessible by the multi-service user.

2. The method of claim 1, further comprising capturing the media data transmitted during the telephony session using the media capture device.

3. The method of claim 1, further comprising including signaling information in the call setup request so that the media data transmitted during the telephony session is routed via the media capture device.

4. The method of claim 1, further comprising transmitting a message to inform the user that the captured media data or media data derived therefrom is accessible at the data store.

5. The method of claim 1, further comprising transmitting the stored media data or the media data derived therefrom to a service destination associated with the first telephony party identifier.

6. The method of claim 1, further comprising transmitting the stored media data or the media data derived therefrom to a service destination associated with a second telephony party identifier associated with the second telephony service.

7. The method of claim 1, further comprising transmitting an alert message to the user to inform the user of said capturing of the media data.

8. The method of claim 7, further comprising determining that the user is using a telephony device associated with the first telephony party identifier, and wherein the alert message is operable to cause the telephony device to generate an alert while the telephony device is being used.

9. The method of claim 1, wherein the media data comprises voice data and wherein the method comprises transcribing the voice data to provide text data derived from the voice data.

10. The method of claim 9, wherein transcribing the voice data comprises performing speech-to-text transcription using a speech recognition engine.

11. The method of claim 1, further comprising relaying media data captured during the telephony session or media data derived therefrom to the user.

12. The method of claim 1, further comprising receiving a call interruption request from the user and, in response, joining the user as a party into the telephony session.

13. The method of claim 1, wherein the media data store is associated with the first telephony service.

14. The method of claim 1, wherein the telephony service destination associated with the second telephony service is a mailbox service for the user.

15. The method of claim 1, further comprising including signaling information in the call setup request, the signaling information comprising a telephony party identifier associated with the user.

16. The method of claim 15, wherein said included telephony party identifier associated with the user is associated with the second telephony service.

17. The method of claim 1, wherein the first telephony service is provided by a first telephony service provider and the second telephony service is provided by a second, different telephony service provider.

18. The method of claim 1, wherein the first and second telephony services are provided by the same telephony service provider.

19. The method of claim 1, further comprising using a media data processing engine to process the captured media data before it is stored in the media data store.

20. The method of claim 1, further comprising using a media data processing engine to process the captured media data after it is stored in the media data store.

21. A system for processing media data transmitted during a telephony session for a multi-service user in a telecommunications system, the multi-service user having access to a plurality of telephony services including a first telephony service and a second telephony service, the system comprising:
a receiver configured to receive a call setup request from a calling party directed to a first telephony party identifier associated with the first telephony service;
a call processor configured to determine that the multi-service user is not available via the first telephony service;
a transmitter configured to transmit a call setup request to a telephony service destination associated with the second telephony service to establish a telephony session between the calling party and the telephony service destination associated with the second telephony service;
a processing engine configured to cause media data transmitted during the telephony session to be captured using a media capture device intermediate the calling party and the telephony service destination;
a media data store in which the media data captured by the intermediate media capture device or media data derived therefrom is stored so that the user who was not available via the first telephony service can access the media data after the end of the telephony session to determine what media data was transmitted during the telephony session; and
a transmitter configured to make the stored media data or media data derived therefrom accessible by the multi-service user.

22. A system according to claim 21, further comprising the media capture device intermediate the calling party and the telephony service destination.

23. A computer program product comprising a non-transitory computer-readable storage medium having computer readable instructions stored thereon, the computer readable instructions being executable by a computerized device to cause the computerized device to perform a method for processing media data transmitted during a telephony session for a multi-service user in a telecommunications system, the multi-service user having access to a plurality of telephony services including a first telephony service and a second telephony service, the method comprising:
receiving a call setup request from a calling party directed to a first telephony party identifier associated with the first telephony service;
determining that the multi-service user is not available via the first telephony service;
transmitting a call setup request to a telephony service destination associated with the second telephony service to establish a telephony session between the calling party and the telephony service destination associated with the second telephony service;
causing media data transmitted during the telephony session to be captured using a media capture device intermediate the calling party and the telephony service destination;
storing the media data captured by the intermediate media capture device or media data derived therefrom in a media data store so that the user who was not available via the first telephony service can access the media data after the end of the telephony session to determine what media data was transmitted during the telephony session; and
making the stored media data or media data derived therefrom accessible by the multi-service user.

* * * * *